3,654,289
CERTAIN DERIVATIVES OF 5-H[4,3-b] AND 9-H[3,4-b]-1,2,3,4-TETRAHYDROPYRIDOINDOLES
Gerard Y. Paris, Duvernay, Quebec, and David L. Garmaise, Montreal, Quebec, Canada, assignors to Abbott Laboratories, Chicago, Ill.
No Drawing. Filed Apr. 9, 1970, Ser. No. 27,116
Int. Cl. C07d 31/42, 31/44
U.S. Cl. 260—295 C
7 Claims

ABSTRACT OF THE DISCLOSURE

A new series of closely related compounds, the β- and γ-carbolines, carrying simple substituents in specific positions of the molecule were found to be highly effective against *T. cruzi* in very low concentrations.

DETAILED DESCRIPTION OF THE INVENTION

*Trypanosoma cruzi* is a progessive and contagious, insect-transmitted disease, frequently called Chagas' disease which is widespread in Latin America, affecting various mammals, including humans. It is estimated that in certain areas, 10 percent of the total population is infected; about ⅔ of all persons with the chronic diseases are between the ages of 11 and 40. The infection progresses usually over a period of years, producing rhythm irregularities and other heart symptoms, intermittent fever, edema and other manifestations. The acute phase causes considerable enlargement of the lymph nodes, spleen and liver.

Unfortunately, to date no successful control of the disease is known; the most promising methods involve destruction of the infected domestic animals and the disease spreading insects.

It has now been found that a new series of chemical compounds is highly effective against the flagellate stage of *T. cruzi;* they are the pyridoindole derivatives of the formula

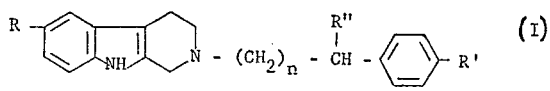

and

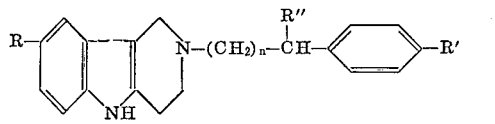

wherein R is hydrogen, fluorine or methyl; R' is hydrogen, fluorine, amino or acetylamino; R" is hydrogen or hydroxy; and n is 1–3, with the further provision that at least one of the substituents R, R' and R" is different from hydrogen. The compounds of Formula I are often referred to as 2,6-disubstituted 1,2,3,4-tetrahydro-β-carbolines or 1,2,3,4-tetrahydro-9H-pyrido[3,4b] indoles; those of structure II are the 2,8-disubstituted 1,2,3,4-tetrahydro-5H-pyrido[3,4b]indoles or the corresponding γ-carbolines.

The new compounds show excellent activity against cultures of *T. cruzi* at concentrations between 1 and 100 p.p.m. Specific compounds of the new series have also been found to be highly effective analgetics. For instance, the compound of structure II wherein R is fluorine, R' is amino, R" is hydrogen and n is 1 shows an $ED_{50}$ of 8.4 mg./kg. in warm-blooded animals with an oral $LD_{50}$ of 200 mg./kg. Other compounds of the series are effective analgetics at oral dosages of between 10 and 30 mg./kg. and in most instances, the oral $LD_{50}$ values are between 500 and >1000 mg./kg., i.e., these compounds have an even more impressive therapeutic index than the γ-carboline described above.

The compounds of the present invention can be made by simple hydrogenation procedures; the compounds wherein R" is a hydroxy group are easily obtained by hydrogenating the corresponding β- or γ-carbolines which carry an oxo group in the α-position to the phenyl ring. A neutral, inert solvent such as methanol, ethanol, ethyl acetate, methyl Cellosolve is used and platinum or platinum or platinum oxide is employed as the catalyst. The yields are usually excellent and often approach theory. When R" is intended to be hydrogen, the above procedure can be used but, preferably, palladium is employed as the catalyst and the reaction solvent preferably is an inert acid such as acetic acid or hydrochloric acid.

The compounds wherein R" is hydrogen can also be made by a simple condensation of the corresponding β- or γ-carboline with the corresponding phenylalkyl halide, e.g., phenethyl chloride, p-fluorophenethyl bromide, using an inert reaction medium, e.g., dimethylformamide. When R' of the desired end product is to be the amino group or acetamido, the corresponding nitrophenylalkyl halide is used for the condensation reaction, followed by catalytic or electrolytic reduction of the nitro group to the amino group in known fashion. If desired, the resulting amino group is acetylated in acetic anhydride according to well established procedures.

In order to illustrate in detail the procedures for making the above compounds, reference is made to the following examples which, however, are not intended to limit the invention in any respect.

EXAMPLE 1

2-[4-(p-fluorophenyl)-4-hydroxybutyl]-1,2,3,4-tetrahydro-9H-pyrido[3,4b]indole

To a solution of 3.73 g. of 2-[3-(p-fluorobenzoyl)-propyl]-1,2,3,4-tetrahydro-9H - pyrido[3,4b]indole hydrochloride in 150 ml. methanol was added 0.5 g. of platinum oxide and the mixture was hydrogenated at 55 p.s.i. and at room temperature for 17 hours. The catalyst was removed by filtration and the filtrate was evaporated to dryness. The residue was dissolved in 400 ml. of hot water and 50% sodium hydroxide solution was added until the solution was basic. A solid formed which was filtered and recrystallized from methanol yielding 3.1 g. (91.5%) of the compound of structure I (n=3; R=H, R'=F; R"=OH), melting at 162–3° C. An analytical sample melted at 164–65° C.

EXAMPLE 2

2-[4-(p-fluorophenyl)-4-hydroxybutyl]-6-fluoro-1,2,3,4-tetrahydro-9H-pyrido[3,4b]indole In analogy to Example 1, using 0.35 g. platinum oxide, 2.9 g. of 2-[3-(p-fluorobenzoyl)propyl]-6-fluoro-1,2,3,4-tetrahydro-9H-pyrido[3,4b]indole hydrochloride in 100 ml. of methanol produced 2.4 g. (91%) of the compound of formula I (R is F; R' is F; R" is OH and n is 3) after 17 hours of hydrogenation at 60° C. and 55 p.s.i. The purified compound melts at 159–60° C.

EXAMPLE 3

2-[3-(phenyl)-3-hydroxypropyl]-6-fluoro-1,2,3,4-tetrahydro-9H-pyrido[3,4b]indole Following the procedure of Example 1 using 0.7 g. of platinum oxide, 4.3 g. of 2-[2-(benzoyl)ethyl]-6-fluoro-1,2,3,4-tetrahydro-9H-pyrido[3,4b]indole in 250 ml. of methanol and heating the mixture to 60° C. for 3 hours at 55 p.s.i., the desired compound of structure I (R is F; R' is H; R" is OH and $n$ is 2) was obtained in a yield of 2.8 g. (64%); it melts at 183–5° C.

EXAMPLE 4

2-[3 - (p-fluorphenyl)-3-hydroxypropyl]-6-fluoro-1,2,3,4-tetrahydro-9H-pyrido[3,4b]indole In analogy to Example 3 but using 4.6 g. of 2-[2-(p-fluorobenzoyl)ethyl] - 6 - fluoro-1,2,3,4-tetrahydro-9H-pyrido[3,4b]indole and hydrogenating the mixture for 20 hours at 25° C., 3.5 g. (76%) of the desired compound of structure I (R is F; R' is F; R" is OH and $n$ is 2) was obtained; it melts at 182–4° C.

EXAMPLE 5

2-[3-(p-fluorophenyl)-3-hydroxypropyl]-6-methyl-1,2,3,4-tetrahydro-9H-pyrido[3,4b]indole Using 0.5 g. of platinum oxide, 3.0 g. of 2-[2-(p-fluorobenzoyl)ethyl]-6-methyl - 1,2,3,4 - tetrahydro-9H-pyrido[3,4b]indole in 200 ml. of methanol, hydrogenation at room temperature and 55 p.s.i. for 24 hours yielded the desired compound of structure I (R is methyl; R' is F; R" is OH and $n$ is 2) in an amount of 2.1 g. (68%); it melts at 182–3° C.

EXAMPLE 6

2-[4-(p-fluorophenyl)-4-hydroxybutyl]-8-fluoro-1,2,3,4-tetrahydro-5H-pyrido[4,3b]indole hydrochloride By hydrogenating a mixture of 0.25 g. of platinum oxide and 1.95 g. of 2-[3-(p-fluorobenzoyl)-propyl]-8-fluoro - 1,2,3,4-tetrahydro-5H-pyrido[4,3b]indole hydrochloride in 50 ml. of methanol at room temperature and 50 p.s.i. for 6 hours, the desired compound of structure II (R=R'=F; R" is OH and $n$ is 3) is obtained after work-up as described in Example 1 as an amorphous product in a yield of 1.9 g. (92%). It was purified from alcohol/ether.

EXAMPLE 7

2-[3-(p-fluorophenyl)-3-hydroxypropyl]-8-fluoro-1,2,3,4-tetrahydro-5H-pyrido[4,3b]indole In analogy to Example 4 but hydrogenation for 24 hours using 2-[2-(p-fluorobenzoyl)-ethyl]-8-fluoro-1,2,3,4-tetrahydro-5H-pyrido[4,3b]indole as the starting material, 3.2 g. (71%) of the desired product of structure II is obtained (R=R'=F; R" is OH and $n$ is 2). An analytical sample melted at 198–200° C. after recrystallization from ethanol.

EXAMPLE 8

2-[3-phenyl-3-hydroxypropyl]-8-fluoro-1,2,3,4-tetrahydro-5H-pyrido[4,3b]indole

Using 3.9 g. of 2-[2-benzoylethyl]-8-fluoro-1,2,3,4-tetrahydro-5H-pyrido[4,3b]indole in the procedure of Example 7 for 30 hours, the desired product of structure II (R is F; R' is H; R" is OH and $n$ is 2) is obtained in a yield of 2.4 g. (38%). An analytical sample, recrystallized from methanol, melts at 164–6° C.

EXAMPLE 9

2-phenethyl-8-fluoro-1,2,3,4-tetrahydro-5H-pyrido[4,3b]indole

A stirred solution of 9.9 g. of 8-fluoro-1,2,3,4-tetrahydro-5H-pyrido[4,3b]indole and 3.7 g. of 2-phenethyl chloride in 200 ml. N,N-dimethylformamide was heated at 100° C. for 6 hours. The reaction mixture was evaporated to dryness and the residue was treated with 200 ml. of acetone. The 8-fluoro-1,2,3,4-tetrahydro-5H-pyrido [4,3b]indole hydrochloride was filtered off. Evaporation of the filtrate yielded a solid which was crystallized from alcohol, yielding 2.9 g. (38%) of the compound of structure II (R=F; R'=R"=H; $n$=1). An analytical sample melted at 161–163° C.

EXAMPLE 10

2-(4-phenylbuytl)-8-fluoro-1,2,3,4-tetrahydro-5H-pyrido[4,3b]indole

Replacing the 2-phenethyl chloride in Example 9 with 4-phenylbutyl chloride and reacting the mixture at 50° C. for 3 hours, the desired product of structure II (R=F; R'=R"=H; $n$=3) was obtained in a yield of 2.6 g. (60%). An analytical sample melted at 147–9° C.

EXAMPLE 11

2-(4-aminophenethyl)-8-fluoro-1,2,3,4-tetrahydro-5H-pyrido[4,3b]indole

A mixture of 22.6 g. of 8-fluoro-1,2,3,4-tetrahydro-5H-pyrido[4,3b]indole hydrochloride, 27.6 g. of p-nitrophenethyl bromide, 27.6 g. anhydrous potassium carbonate and 16.6 g. of potassium iodide in 400 ml. of N,N-dimethylformamide was heated at 80° for 7 hours. The cooled mixture was poured into about 1 liter of water. On scratching, the oily product solidified. The crude solid was recrystallized from alcohol to yield 21.9 g. (52%) of the desired product of structure II (R=F; R'=NO₂; R"=H; $n$=1). A recrystallized sample melted at 165–7° C.

A mixture of 10.2 g. of this compound and 0.5 g. of platinum oxide in 2.75 ml. of ethanol was hydrogenated at room temperature and 50 p.s.i. until hydrogen uptake ceased. The catalyst was removed by filtration and the filtrate was evaporated to produce an oil which upon treatment with 2-propanol, yielded 7.4 g. (80%) of the desired solid of structure II (R=F; R'=NH₂; R"=H; $n$=1), melting at 156–8° C.

EXAMPLE 12

2-(4-acetylaminophenethyl)-8-fluoro-1,2,3,4-tetrahydro-5H-pyrido[4,3b]indole hydrochloride Acetic anhydride (2.46 g.) was added to a solution of 6.0 g. of the product of Example 11 in 30 ml. of acetic acid and 30 ml. of water. The reaction mixture was heated on a steam bath for 30 minutes. On cooling and adding 2 ml. of concentrated hydrochloric acid, a solid formed. The desired compound of Formula II (R=F;

R'=NHCOCH₃

R"=H; $n$=1) was so obtained in a yield of 5 g. (66%) melting at 239–41° C.

EXAMPLE 13

2-(4-phenylbutyl)-6-fluoro-1,2,3,4-tetrahydro-9H-pyrido[3,4b]indole

A stirred solution of 10.0 g. of 6-fluoro-1,2,3,4-tetrahydro-9H-pyrido[3,4b]indole and 4.4 g. of 4-phenyl-1-butyl chloride in 50 ml. of N,N-dimethylformamide was heated at 100–110° for 5 hours. The desired product of Formula I (R=F; R'=R"=H; $n$=3) was isolated as described in Example 9 in a yield of 4.8 g. (56%). An analytical sample melted at 161–162° C.

EXAMPLE 14

2-phenethyl-6-methyl-1,2,3,4-tetrahydro-9H-pyrido[3,4b]indole

A stirred solution of 5.6 g. of 6-methyl-1,2,3,4-tetrahydro-9H-pyrido[3,4b]indole and 2.1 g. of 2-phenethyl chloride in 50 ml. of N,N-dimethylformamide was heated at 100° C. for 6 hours. The desired product of structure I (R=CH₃; R'=R"=H; n=1) was isolated as described in Example 9 in a yield of 3.1 g. (71%) melting at 156–158° C.

EXAMPLE 15

2-(4-phenylbutyl)-6-methyl-1,2,3,4-tetrahydro-9H-pyrido[3,4b]indole

A stirred solution of 3.7 g. of 6-methyl-1,2,3,4-tetrahydro-9H-pyrido[3,4b]indole and 1.7 g. of 4-phenyl-1-butyl chloride in 50 ml. of N,N-dimethylformamide was heated at 100° for 6 hours. The product was isolated as described in Example 9, yielding 1.9 g. (59%). An analytical sample of the compound of structure I (R=CH₃; R'=R"=H; n=3) melted at 120–122° C. (from alcohol).

EXAMPLE 16

2-(3-phenylpropyl)-6-methyl-1,2,3,4-tetrahydro-9H-pyrido[3,4b]indole

A stirred solution of 3.7 g. of 6-methyl-1,2,3,4-tetrahydro-9H-pyrido[3,4b]indole and 1.59 g. of 3-phenyl-1-propyl bromide in 50 ml. of N,N-dimethylformamide was heated at 100° for 6 hours. The desired product of structure I (R=CH₃; R'=R"=H; n=2) was isolated as described in Example 9 and obtained in a yield of 3.1 g. (56%). An analytical sample melted at 160–162° C.

EXAMPLE 17

2-(phenethyl)-6-fluoro-1,2,3,4-tetrahydro-9H-pyrido[3,4b]indole

A stirred solution of 3.8 g. of 6-fluoro-1,2,3,4-tetrahydro-9H-pyrido[3,4b]indole and 1.41 g. of 2-phenethyl chloride in 50 ml. of N,N-dimethylformamide was heated at 100–110° for 5 hours. The desired product of structure I (R=F; R'=R"=H; n=1) was isolated as described in Example 9. An analytical sample melted at 155–156° C. (from alcohol) and the product was obtained in a yield of 1.59 g. (51%).

EXAMPLE 18

2-(4-aminophenethyl)-6-methyl-1,2,3,4-tetrahydro-9H-pyrido[3,4b]indole

A solution of 7.5 g. of 6-methyl-1,2,3,4-tetrahydro-9H-pyrido[3,4b]indole and 4.6 g. of p-nitrophenethyl bromide in 100 ml. of N,N-dimethylformamide was heated at 90° C. for 6 hours. The reaction mixture was evaporated to dryness to yield a solid which was treated with 200 ml. of acetone. The insoluble 6-methyl-1,2,3,4-tetrahydro-9H-pyrido[3,4b]indole hydrobromide was filtered off. Evaporation of the solvent yielded 3.3 g. of 2-(4-nitrophenethyl) - 6 - methyl - 1,2,3,4-tetrahydro-9H-pyrido-[3,4b]indole, melting at 164–166° C. An analytical sample melted at 166–168° C.

A mixture of 0.5 g. of platinum oxide and 2.95 g. of 2 - (4 - nitrophenethyl)-6-methyl-1,2,3,4-tetrahydro-9H-pyrido[3,4b]indole in 200 ml. of methanol was hydrogenated at room temperature and at 55 p.s.i. for 2.5 hours. The desired product of formula I (R=CR₃; R'=NH₂; R"=H; n=1) was isolated as described in Example 11 and obtained in a yield of 2.1 g. (78%); it melted at 173–4° C.

EXAMPLE 19

2-(4-acetylaminophenethyl)-6-methyl-1,2,3,4-tetrahydro-9H-pyrido[3,4b]indole hydrochloride By following the procedure of Example 12 with the compound of Example 11, the compound of structure I (R=CH₃; R'=NHCOCH₃; R"=H, n=1) was obtained in a yield of 74%. The pure compound decomposed >295° C.

EXAMPLE 20

2-(4-aminophenylbutyl)-8-fluoro-1,2,3,4-tetrahydro-5H-pyrido[4,3b]indole

A mixture of 19.0 g. of 8-fluoro-1,2,3,4-tetrahydro-5H-pyrido[4,3b]indole and 10.7 g. of p-nitrophenylbutyl chloride in 150 ml. of N,N-dimethylformamide was heated at 90° C. for 6 hours. The reaction mixture was evaporated to dryness yielding an oil. Treatment with 300 ml. of acetone yielded 8-fluoro-1,2,3,4-tetrahydro-5H-pyrido-[4,3b]indole hydrochloride. The acetone layer was evaporated to dryness yielding an oil. On standing the oil crystallized, M.P. 203–205° C. Crystallization of the crude solid from alcohol yielded 7.0 g. (38%) of the compound of Formula II (R=F; R'=NO₂; R"=H, n=3) melting at 206–208° C. A second crystallization raised the melting point to 207–209° C.

Platinum oxide (0.8 g.) was added to a solution of 4.8 g. of 2-(4-nitrophenylbutyl)-8-fluoro-1,2,3,4-tetrahydro-5H-pyrido[4,3b]indole in 150 ml. of alcohol. The reaction mixture was hydrogenated at room temperature and 50 p.s.i. until no more hydrogen was absorbed. The catalyst was removed by filtration and the filtrate was evaporated to dryness to give a solid, 3.2 g. (73%). After recrystallization from ethanol, the compound of Formula II (R=F; R'=NH₂; R"=H; n=3) was obtained; it melts at 163–5° C.

EXAMPLE 21

2-[3-(p-fluorophenyl)-3-hydroxypropyl]-1,2,3,4-tetrahydro-9H-pyrido[3,4b]indole

A mixture of 0.4 g. of platinum oxide and 1.9 g. of 2 - [3 - (p-fluorobenzoyl)ethyl] - 1,2,3,4-tetrahydro-9H-pyrido[3,4b]indole in 150 ml. of methanol was hydrogenated at room temperature at 50 p.s.i. for 24 hours. The hydroxy compound was isolated as described in Example 4, yielding 1.2 g. (63%) of the compound of Formula I (R=H; R'=F; R"=OH; n=2) melting at 211–3° C.

EXAMPLE 22

To test the activity against *T. cruzi*, standard techniques were used. As the test medium, sterilized brain heart infusion broth was used in 10-ml. amounts. The stock culture was grown on blood slants with an overlay of 7 ml. brain heart infusion broth for one week at 28° C. The slants were prepared from 1.5 g. agar, 0.6 g. sodium chloride, 0.5 g. of dried pancreatic casein digest and 95 ml. of water; autoclaving this mixture for 15 minutes, cooling, adding 17 ml. of citrated rabbit blood and placing it in slanted test tubes in 10-ml. amounts. Standard tube dilution technique in 10-fold levels (100, 10 and 1 μg./ml. levels) were used. A test inoculum of 0.1 ml. of the undiluted 1-week stock culture was used and the tubes were incubated for 1 week at 28° C. The presence or absence of growth was read microscopically and, in questionable cases, under the microscope. The highest log dilution of the test compound was recorded in minimum inhibitory concentration (M.I.C.) values.

In this fashion, the compounds of Examples 9, 12 and 13 showed a M.I.C. of 100 parts per million and the compounds of Examples 4, 5, 6, 11, 15 and 16 demonstrated a M.I.C. of 10 p.p.m.

Among the compounds described above, the γ-carbolines carrying a substituent of the group enumerated above in the 8-position, specifically fluorine, are preferred and among the β-carbolines, those carrying a methyl group in the 6-position are preferred. These compounds exhibit analgetic properties as well as pronounced activity against cultures of *T. cruzi*.

As seen above, the compounds of Formulas I and II are made from the corresponding α-oxophenyl derivatives by catalytic hydrogenation. Whether R″ is H or OH, the hydrogenation is carried out in an acid medium, preferably a mixture of hydrochloric and acetic acids. Acetic acid is a preferred reaction medium because it is inert and has excellent solubility characteristics for the materials involved in the reaction. When platinum is used as the catalyst, the reaction procedes no further than the alcohol stage, i.e., the compound wherein R″ is OH. With palladium, the reaction goes ultimately to the hydrocarbon stage. If such total hydrogenation is desired, the activity of the catalyst can be promoted by the addition of a few drops of perchloric acid to the hydrogenation mixture. This has the further advantage to carry the reaction exactly to the desired end point and no over-hydrogenation will take place.

The hydrogenation is carried out at a temperature between room temperature and 75° C., preferably at around 60° C. which temperature produces a satisfactory reaction speed with no detrimental effects on the reactant or end product. At 60° C., the reaction is complete in about 4–8 hours, with 99% hydrogen uptake achieved in 4 hours.

The amount of catalyst is usually between 20 and 30% of 5% metal supported on carbon, alumina, silica gel or the like. The catalyst-plus-carrier figure given above is based on the amount of carbonyl compound to be reduced and is independent of the amount of solvent.

The new compounds can be used for the above described purpose in the form shown by Formulas I and II or in the form of their non-toxic acid addition salts. Among the salts preferred are the hydrochlorides, sulfates, phosphates, tartrates, acetates, citrates succinates and the like. The salt or bases can be administered in capsules, tablets, pills, wafers or as suspensions in a non-toxic carrier such as the usual sugar syrup. In each instance, they can be combined with the usual excipients such as flavoring agents, fillers and other tableting or suspension aids for oral dosage forms which are administered at 5–50 mg./kg.

We claim:
1. A compound of the formula

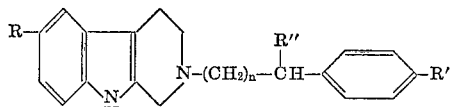

or

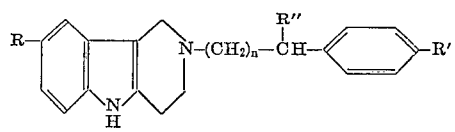

wherein R is hydrogen, fluorine or methyl; R′ is hydrogen, fluorine, amino or acetylamino; R″ is hydrogen or hydroxy; and $n$ is 1–3, with the further provision that at least one of the substituents R, R′ and R″ is different from hydrogen, or a non-toxic acid addition salt thereof.

2. The compound of claim 1 with structure I wherein R is hydrogen, R′ is fluorine, R″ is hydroxy and $n$ is 3.

3. The compound of claim 1 with structure II wherein R is fluorine, R′ is amino, R″ is hydrogen and $n$ is one.

4. The compound of claim 1 with structure II wherein R is fluorine, R′ is acetylamino, R″ is hydrogen and $n$ is one.

5. The compound of claim 1 with structure II wherein R and R″ is hydroxy and $n$ is 3.

6. The compound of claim 1 with structure I wherein R is methyl, R′ and R″ both are hydrogen and $n$ is 3.

7. The compound of claim 1 with structure I wherein R is methyl, R′ and R″ both are hydrogen and $n$ is 2.

References Cited
UNITED STATES PATENTS 3,448,114    6/1969    Johnson et al. _____ 260—296

ALAN L. ROTMAN, Primary Examiner

U.S. Cl. X.R.

260—296 A, 295 S; 424—263, 266

UNITED STATES PATENT OFFICE
Certificate

Patent No. 3,654,289                                                      Patented April 4, 1972

Gerard Y. Paris and David L. Garmaise

Application having been made by Gerard Y. Paris and David L. Garmaise, the inventors named in the patent above identified, and Abbott Laboratories, North Chicago, Illinois, a corporation of Illinois, the assignee, for the issuance of a certificate under the provisions of Title 35, Section 256, of the United States Code, adding the name of Robert P. Johnson as a joint inventor, and a showing and proof of facts satisfying the requirements of the said section having been submitted, it is this 2nd day of July 1974, certified that the name of the said Robert P. Johnson is hereby added to the said patent as a joint inventor with the said Gerard Y. Paris and David L. Garmaise.

FRED W. SHERLING,
*Associate Solicitor.*